United States Patent [19]

Miyazawa

[11] Patent Number: 4,733,341
[45] Date of Patent: Mar. 22, 1988

[54] PLURAL INVERTER SYNCHRONIZER AND CONTROL APPARATUS

[75] Inventor: Yoshiaki Miyazawa, Tokyo, Japan

[73] Assignee: Kabushiki Kaisha Toshiba, Kawasaki, Japan

[21] Appl. No.: 943,727

[22] Filed: Dec. 19, 1986

[30] Foreign Application Priority Data

Dec. 20, 1985 [JP] Japan .................. 60-286931

[51] Int. Cl.$^4$ ............................. H02M 7/42
[52] U.S. Cl. ...................... 363/71; 307/82; 363/95
[58] Field of Search ............ 307/65, 82; 363/71, 363/95

[56] References Cited

U.S. PATENT DOCUMENTS

| | | | |
|---|---|---|---|
| 4,171,517 | 10/1979 | Higa et al. ........................ | 307/265 |
| 4,176,392 | 11/1979 | Cronin et al. ..................... | 363/71 |
| 4,587,604 | 5/1986 | Nerone ............................. | 363/71 |
| 4,641,042 | 2/1987 | Miyazawa ......................... | 307/65 |

FOREIGN PATENT DOCUMENTS 58-46955 10/1983 Japan .

OTHER PUBLICATIONS

Power Electronics—Power Semiconductors and Their Applications, (pp.142–145), Second International Conference Sep. 27–29, 1977.

*Primary Examiner*—Patrick R. Salce
*Assistant Examiner*—Jeffrey Starrett
*Attorney, Agent, or Firm*—Oblon, Fisher, Spivak, McClelland & Maier

[57] ABSTRACT

An inverter control apparatus contains digital phase-locked loop oscillators, in order to achieve a synchronization with a reference frequency of a commercial power supply. The inverters are activated by outputs from programmable dividers for frequency-dividing the output pulses from the digital phase-locked loop oscillators. The frequency-dividing ratio of each of the programmable dividers is changed in accordance with the deviation of the active output powers of the inverters.

9 Claims, 5 Drawing Figures

PLURAL INVERTER SYNCHRONIZER AND CONTROL APPARATUS

BACKGROUND OF THE INVENTION

The present invention relates to an apparatus for controlling an inverter operated in a parallel mode, with respect to another power supply, and in synchronism with a reference frequency signal of a stand-by commercial power supply.

In order to improve the system's reliability, a parallel operating system of plural inverters is often employed in a uninterruptible power supply system. Another type of power supply system, which is also widely employed for the same purpose, includes a changeover switch connected between the output of inverters operating in parallel and a stand-by commercial power supply (a reserved power source). In this power supply system, if the parallel operating inverters are subjected to a system breakdown, or when the inverters are to be thoroughly checked for maintenance and repair, the changeover switch is switched so that a load can be uninterruptedly and continuously supplied with power from the stand-by commerical power supply.

In such a system, it must be ensured that the output phases of the respective inverters match with each other, and also that the output phase of the inverters matches that of the stand-by commercial power supply. According to a prior art, the above phase-matching control is performed by an analog technique.

However, owing to an operating point offset, electrical characteristic fluctuation, operating point temperature drift, aging etc., of operational amplifiers and other associated circuits, an analog control apparatus requires complex circuitry and/or precise adjustments for compensating for these shortcomings. Further, to ensure the stable operating of the apparatus over a long period of time, it is necessary to inspect and readjust the apparatus within a relatively short cyclic period of time, in order that the aging of the control apparatus can be properly compensated for.

SUMMARY OF THE INVENTION

It is accordingly an object of the present invention to provide an apparatus for controlling an inverter or inverters, so that it is operated in a parallel mode with respect to another power supply, and in synchronism with a reference frequency of a stand-by commercial power supply, etc., which apparatus can permit simplification of its circuit arrangement, by use of a digital technique, and can maintain a stable electrical characteristic with a concise adjustment.

To achieve the above object, an inverter control apparatus of the present invention contains a DPLL (digital phase-locked loop) oscillator in place of a conventional analog PLL system, in order to achieve synchronization with a reference frequency of a stand-by commercial power supply, etc. The inverter is activated by an output from a programmable divider for frequency-dividing an output pulse of the DPPL oscillator. The frequency-dividing ratio of the programmable divider is changed in accordance with the deviation of output active power of the inverter from a prescribed value.

DETAILED DESCRIPTION OF THE PREFERRED EMBODIMENT

Figure 1:
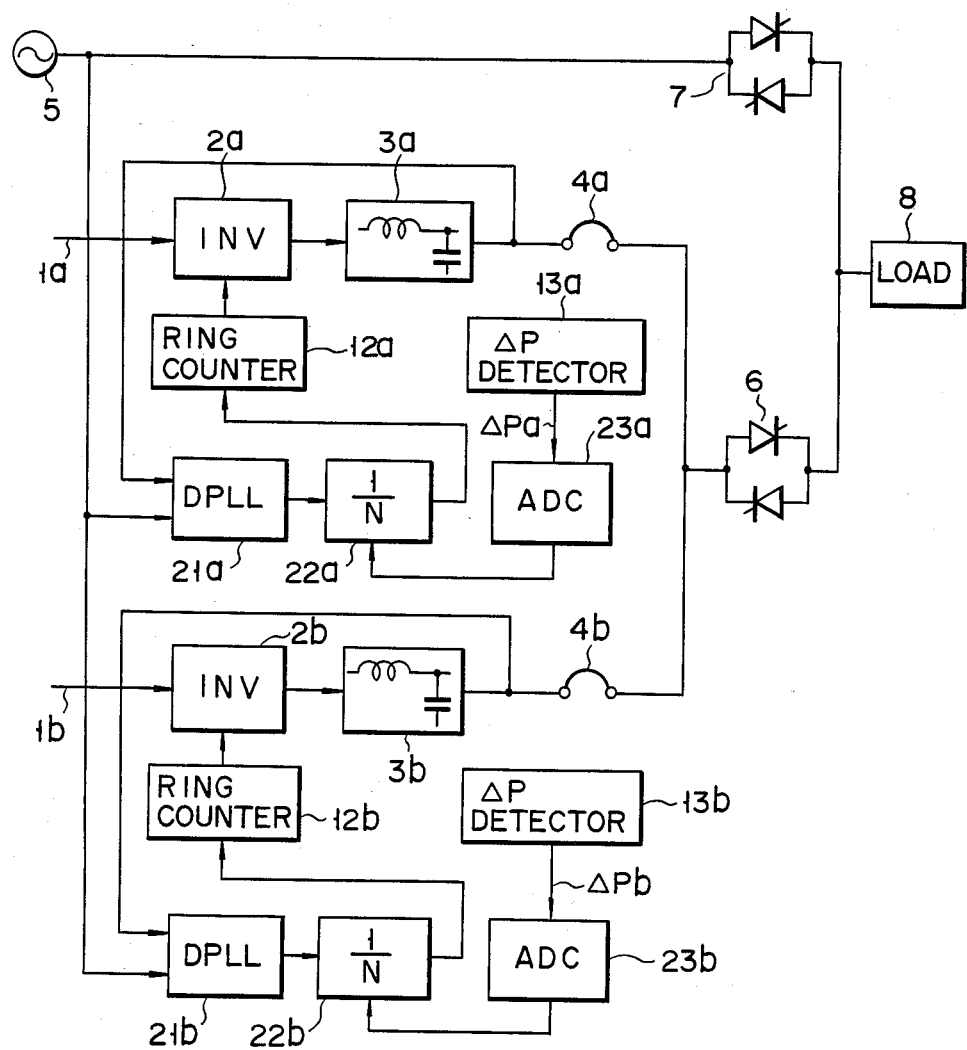
FIG. 1 is a block diagram showing an embodiment (digital circuit) of the present invention.

Hereinafter, preferred embodiments of the invention will be described in detail, with reference to the accompanying drawings. In the following description, the same or similar elements are denoted by the same or similar reference numerals throughout the drawings, thereby avoiding redundant explanations.

An inverter control apparatus according to an embodiment of the present invention will now be described below, with reference to FIG. 1. (In FIG. 1, first and second units of inverters are distinguished from each other, by use of the subscripts a and b, respectively.) DC voltages are obtained via rectifiers (not shown) or from batteries (not shown), or by a combination thereof. Such DC voltages are applied to DC power line $1a$ of inverter $2a$, and power line $1b$ of inverter $2b$, respectively. Inverters $2a$ and $2b$ convert the voltages on DC lines $1a$ and $1b$, to AC currents. AC filters $3a$ and $3b$ are connected to the AC outputs of inverters $2a$ and $2b$, respectively, in order to change the inverter outputs into sinusoidal waves. Circuit breakers $4a$ and $4b$ are respectively connected to the output circuits of AC filters $3a$ and $3b$, to allow inverters $2a$ and $2b$ to be connected in parallel or to disconnect one inverter ($2a$) from the other inverter ($2b$).

The connection node between circuit breakers $4a$ and $4b$ is coupled, via static type changeover switch (semiconductor switch) 6, to load 8. Load 8 is also coupled, via static type changeover switch (semiconductor switch) 7, to commerical power supply 5. Switches 6 and 7 can uninterruptedly change the connection of load 8, between the AC output of the inverters and the AC line of stand-by commerical power supply 5.

The circuit of FIG. 1 further includes DPLL (digital phase-locked loop) oscillators $21a$ and $21b$ for comparing the voltage phase of stand-by commerial power supply 5 with that of the outputs from filters $3a$ and $3b$; 1/N frequency dividers $22a$ and $22b$ for frequency-dividing, by N, the outputs from DPLL oscillators $21a$ and $21b$; ring counters $12a$ and $12b$ for generating gate pulses for activating inverters $2a$ and $2b$ in accordance with the frequency-divided outputs from dividers $22a$ and $22b$; active power-deviation detectors $13a$ and $13b$ for detecting a deviation ($\Delta P$) in the active power obtained from inverters $2a$ and $2b$; and AD converters $23a$ and $23b$ for respectively converting analog output data of detectors $13a$ and $13b$ into digital frequency-dividing data for 1/N frequency dividers $22a$ and $22b$. DPLL oscillators $21a$ and $21b$ are comprised of a digital circuit, and produce oscillation pulses so that the respective output phases of the inverters correspond to the phase of power supply 5.

In practice, it is necessary to use a voltage control process for correcting any reactive power deviation, in order to exactly perform a parallel operation of inverters $2a$ and $2b$. However, since such a voltage control process is well-known, a detailed explanation thereof will be omitted. The reactive power control device used to achieve the above voltage control process is known from the following document, for example:

Seki et al., "PARALLEL OPERATION OF INVERTER SETS BY A NEW DIGITAL CONTROL TECHNIQUE", IEE POWER ELECTRONICS- POWER SEMICONDUCTORS AND THEIR APPLICATIONS, CONFERENCE PAPER 27-29 September 1977. (cf FIG. 2b)

Figure 2:
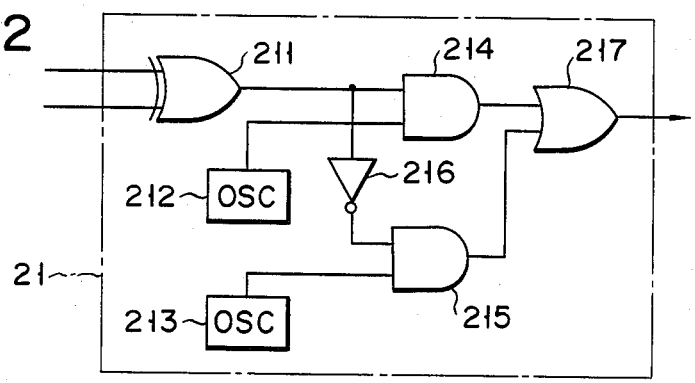
FIG. 2 exemplifies a circuit diagram of the digital PLL (DPLL) shown in FIG. 1.

Details of each of DPLL oscillators 21a and 21b are shown in FIG. 2.

In FIG. 2, exclusive OR (EXOR) gate 211 receives the voltage of power supply 5 and that of the output from filter 3a or 3b, and operates as a phase-difference detector. An output from EXOR gate 211 is supplied to one input of AND gate 214 and, via inverting amplifier 216, to one input of AND gate 215. The other input of AND gate 214 receives an output of crystal oscillator 212, and the other input of AND gate 215 receives an output of crystal oscillator 213. The oscillation frequency of crystal oscillator 212 differs somewhat from that of crystal oscillator 213. Outputs from AND gates 214 and 215 are supplied to OR gate 217. OR gate 217 provides an output pulse from DPLL oscillator 21 (21a, 21b).

In the circuit of FIG. 2, the frequency of the output pulse from DPLL oscillator 21 is changed, by varying the duty ratio with which the outputs of crystal oscillators 212 and 213 are selected, in accordance with the output level of EXOR gate 211.

Programmable dividers 22a and 22b are so operated that the frequency-dividing ratio N is varied within a range of No±ΔN according to active power deviation Δp, where Δp=0 for ΔN=0 (ΔN is increased by positive Δp).

The operation of the apparatus of FIG. 1 will now be described below.

DPLL oscillators 21a and 21b allow their output frequencies to vary, based on the aforementioned operation principle, in accordance with a phase difference between the output of the respective inverters and that of stand-by commercial power supply 5, to thereby match the phase of the inverters with that of power supply 5. That is, phase difference Δθ is integrated by controlling frequency f according to that phase difference, so that the phase is controlled with high precision. In this connection it is to be noted that $\theta = \int f dt = \int K \cdot \Delta\theta dt$ (K is a constant)

When, for example, active power deviation ΔP is positive for the first unit of the two inverters, that is, the active power share of the first unit is greater, then deviation ΔP is converted, by AD converter 23a, to a digital code which in turn is fed as frequency-dividing ratio N, to programmable divider 22a, so that ΔP becomes positive (N>No). As a result, the frequency of a signal fed to ring counter 12a is lowered, so that the output phase of inverter 2a is delayed, and hence deviation ΔP is decreased.

On the other hand, the second unit of the two inverters detects ΔP as being negative and, in the second unit, programmable divider 22b is so operated as to permit its frequency-dividing ratio N to be decreased (N<No). As a result, the frequency of a signal fed to ring counter 12b is made higher, so that the output phase of inverter 2b is advanced, and hence deviation ΔP is decreased.

That is, the active power, shared by the respective inverters, can be controlled by varying the frequency-dividing ratio (N) of each of programmable dividers 22a and 22b in accordance with deviation ΔP, so that the active power share of the inverters becomes a proper value.

The control apparatus thus constructed is provided with DPLL oscillators each employing a digital technique and frequency-controlling the respective inverter outputs, to allow the output phase of each of the inverters to coincide with the phase of a stand-by commercial power supply; and with programmable dividers each for frequency-dividing the output of the DPLL oscillator and varying its frequency-dividing ratio. The output of the DPLL oscillator determines the reference frequency for a ring counter of each of the inverters, so that active power deviation ΔP can be corrected, thus obviating the necessity for any complex circuitry, or any exact adjustment, for compensating for the offset voltage, temperature drift, or aging of the circuit components, as encountered in a conventional analog control apparatus, whereby a stable characteristic can be maintained over an extended period of time.

Figure 3:
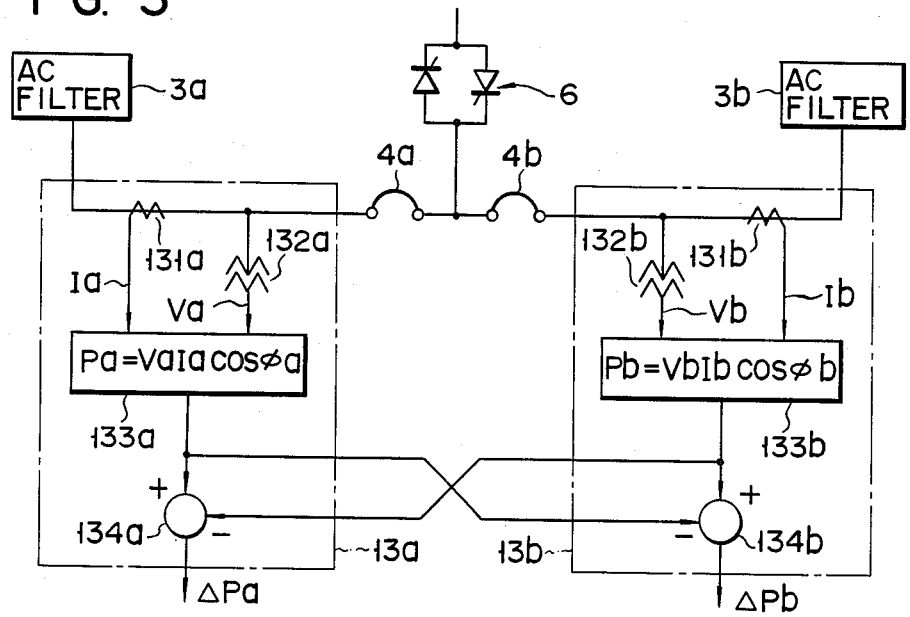
FIG. 3 shows a basic circuit configuration of the active power difference detector circuits shown in FIG. 1.

FIG. 3 shows a basic circuit configuration of the active power-difference detectors shown in FIG. 1. Output current Ia and output voltage Va of inverter 2a, delivered from AC filter 3a, are detected by current transformer 131a and potential transformer 132a, respectively. Similarly, output current Ib and output voltage Vb of inverter 2b, delivered from AC filter 3b, are detected by current transformer 131b and potential transformer 132b, respectively. Currents Ia and Ib are supplied to changeover switch 6, via circuit breakers 4a and 4b, respectively.

Current Ia and voltage Va are input to active-power detector 133a, in which active power Pa of the output from inverter 2a is calculated according to the relation $Pa = Va \cdot Ia \cos \phi a$ (where $\phi a$ denotes the phase difference between Va and Ia). Similarly, current Ib and voltage Vb are input to active power detector 133b, in which active power Pb of the output from inverter 2b is calculated according to the relation $Pb = Vb \cdot Ib \cos \phi b$ (where $\phi b$ denotes the phase difference between Vb and Ib).

Active power Pa generated by detector 133a is subtracted, in subtracter circuit 134a, from active power Pb generated by detector 133b, to thereby produce active power difference ΔPa for AD converter 23a. Similarly, active power Pb generated by detector 133b is subtracted, in subtracter circuit 134b, from active power Pa generated by detector 133a, to thereby produce active power difference ΔPb for AD converter 23b.

In the circuit of FIG. 3, when Pa>Pb, ΔPa becomes positive, while ΔPb becomes negative. When Pa<Pb, ΔPa becomes negative, while ΔPb becomes positive. When Pa=Pb, ΔPa and ΔPb become zero.

The circuit of FIG. 3 can be used for detector circuits 13a and 13b shown in FIG. 1.

Figure 4:
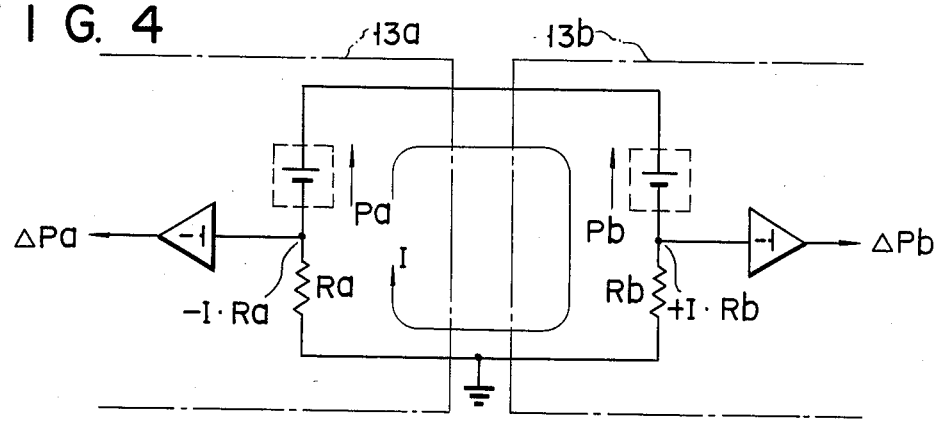
FIG. 4 shows a modification of the circuit shown in FIG. 3.

FIG. 4 shows a modification of the circuit shown in FIG. 3. In FIG. 4, detectors 133a and 133b of FIG. 3 are replaced by equivalent DC voltages Pa and Pb, respectively. The positive end of Pa is connected to that of Pb. The negative end of Pa is connected, via a series circuit of resistors Ra and Rb, to that of Pb. The connection node between resistors Ra and Rb is circuit-grounded.

Assume that DC current I circulates from the Pa side to the Pb side, in the closed circuit of Pa, Pb, Rb, and Ra. In this case, positive potential +I·Rb appears at the node between Pb and Rb, and negative potential −I·Ra appears at the node between Pa and Ra. Potential +I·Rb is converted into active power difference ΔPb for AD converter 23b, via an inverting amplifier. Potential −I·Ra is converted into active power difference ΔPa for AD converter 23a, via an inverting amplifier.

In the circuit of FIG. 4, when Pa>Pb, ΔPa becomes positive, while ΔPb becomes negative. When Pa<Pb, ΔPa becomes negative, while ΔPb becomes positive. When Pa=Pb, ΔPa and ΔPb become zero.

Figure 5:
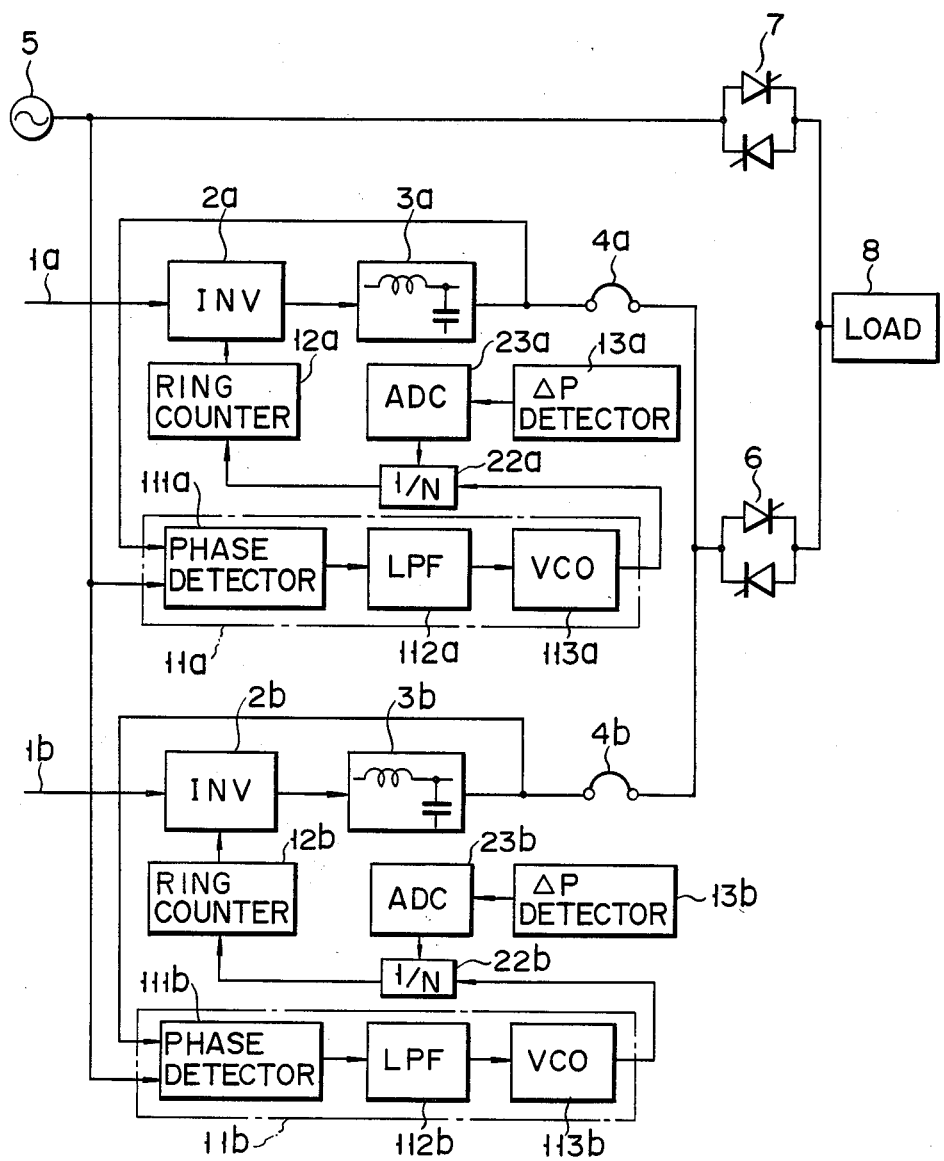
FIG. 5 is a block diagram showing another embodiment (analog/digital hybrid circuit) of the present invention.

FIG. 5 is a block diagram showing another embodiment (analog/digital hybrid circuit) of the present invention.

In this embodiment, analog PLL circuits (11a, 11b) are combined with digital inverter control circuits (12a, 22a, 23a; 12b, 22b, 23b). FIG. 5 differs from FIG. 1 only in that digital PLL oscillators 21a and 21b of FIG. 1 are replaced with analog PLL oscillators 11a and 11b. The circuit operation of FIG. 5 is substantially the same as that of FIG. 1. According to the circuit configuration of FIG. 5, even if analog PLL 11a or 11b is subjected to drifting of circuit parameters, such drifting is reduced by 1/N, by means of digital frequency divider 22a or 22b.

Incidentally, the disclosure of the following document, which relates to a similar art of the present invention, is incorporated in this application:

Higa et al., "APPARATUS FOR SYNCHRONIZATION CONTROL OF A PLURALITY OF INVERTERS", U.S. Pat. No. 4,171,517 issued on Oct. 16, 1979

Although the embodiment described herein is for a control apparatus for two inverters in a parallel array, the same advantage can be obtained by a control apparatus for one inverter, or for three or more parallel inverters. Further, even if the inverter(s) operates in parallel with a power source other than an inverter, such as a fuel cell or solar cell, and even if it operates in parallel with a stand-by commercial power supply system, the same advantage can also be obtained. Furthermore, the reference frequency signal(s) to be synchronized with the output of the inverter(s) is not restricted to the stand-by commercial power supply alone. Such a reference frequency signal can be obtained from a crystal oscillator, for example.

Incidentally, the PLL oscillator circuit itself is of a known type. Japanese Pat. No. 1,215,332 entitled "Apparatus for Operating Inverters in a Parallel Mode" discloses, in detail, the concept of feeding an active power deviation of the inverter back to the PLL oscillator circuit, whereby the deviation is corrected.

As set forth above, according to a control apparatus of the present invention, inverters are operated in a parallel mode with reference to a standby commercial power supply, etc., and in synchronization with a reference frequency of that stand-by commercial power supply, whereby it is possible to obtain stable operation of the inverters, without them being adversely affected by temperature drift, aging etc., of circuit components of the apparatus.

What is claimed is:

1. A control apparatus for controlling an inverter circuit, so that the inverter circuit is operated in synchronism with a predetermined reference frequency, and in a parallel mode with respect to an other power supply, said control apparatus comprising:

phase-locked loop means, coupled to said inverter circuit, for varying an output frequency of said inverter circuit, so that an output phase of said inverter circuit matches a phase of said predetermined reference frequency;

first control means, coupled to said inverter circuit, for detecting an active power deviation between an output of said inverter circuit and that of said an other power; and programmable divider means, coupled to said control means, said phase-locked loop means, and said inverter circuit, for frequency-dividing an output of said phaselocked loop means with a ratio of the frequency dividing depending on said active power deviation is reduced, thereby controlling the share of active power between the output of said inverter circuit and that of said an other power supply.

2. A control apparatus according to claim 1 wherein said an other power supply comprises:

a second inverter circuit operated in synchronism with said predetermined reference frequency;

second phase-locked loop means, coupled to said second inverter circuit, for varying an output frequency of said second inverter circuit, so that an output phase of said second inverter circuit matches a phase of said predetermined reference frequency;

second control means, coupled to said second inverter circuit, for detecting second active power deviation between an output of said second inverter circuit and that of said inverter circuit; and second programmable divider means, coupled to said second control means, said second phase-locked loop means, and said inverter circuit, for frequency-dividing an output of said second phase-locked loop means with a second ratio of the frequency-dividing depending on said second active power deviation, so that the value of the detected second active power deviation is reduced, thereby controlling the share of active power between the output of said second inverter circuit and that of said inverter circuit.

3. A control apparatus according to claim 2, wherein the polarity of the detected active power deviation of said inverter circuit is opposite to that of the detected second active power deviation of said second inverter circuit.

4. A control apparatus according to claim 3, wherein the control means of said inverter circuit comprises:

first active-power detecting means for detecting a first active power of the output of said inverter circuit; and wherein the second control means of said second inverter circuit comprises:

second active-power detecting means for detecting a second active power of the output of said second inverter circuit.

5. A control apparatus according to claim 4, wherein the control means of said inverter circuit further comprises:

first deviation-detecting means, coupled to said first and second active-power detecting means, for detecting a difference between said first and second active powers, to provide the detected active power deviation of said inverter circuit; and wherein the second control means of said second inverter circuit further includes:

second deviation-detecting means, coupled to said first and second active-power detecting means, for detecting a second difference between said first and second active-powers, to provide the detected active power deviation of said second inverter circuit.

6. A control apparatus according to any one of claims 1 thru 5, wherein said phase-locked loop means is formed of a digital circuit.

7. A control apparatus according to claim 6, wherein said digital circuit comprises:
   an exclusive OR gate, responsive to said predetermined reference frequency and a frequency of the output of said inverter circuit, for providing an exclusive OR output of these input frequencies;
   a first oscillator for generating a first frequency signal;
   a second oscillator for generating a second frequency signal, whose frequency differs from that of said first frequency signal; and
   a gate circuit, coupled to said exclusive OR gate, said first oscillator, and said second oscillator, for providing a control output which is used for varying the frequency-dividing ratio of said programmable divider means, such that the frequency of said control output has either said first or second frequency, in accordance with the logical level of said exclusive OR output.

8. A control apparatus according to any one of claims 1 thru 5, wherein said phase-locked loop means includes an analog circuit.

9. A control apparatus according to any one of claims 1 thru 5, wherein said predetermined reference frequency is obtained from an AC power source connected in parallel with the output of said inverter circuit.

* * * * *